United States Patent [19]

Keller

[11] 3,942,362
[45] Mar. 9, 1976

[54] ROOF TRUSS TESTING MACHINE
[76] Inventor: James R. Keller, 1410 NE. Marine Drive, Portland, Oreg. 97211
[22] Filed: Aug. 12, 1974
[21] Appl. No.: 496,528

[52] U.S. Cl................................. 73/88 R; 73/100
[51] Int. Cl.²......................................... G01N 3/08
[58] Field of Search...................... 73/88 R, 100, 94

[56] References Cited
UNITED STATES PATENTS

| | | | |
|---|---|---|---|
| 2,058,444 | 10/1936 | Harrison | 73/88 R |
| 2,668,444 | 2/1954 | Berman | 73/88 R |
| 3,158,021 | 11/1964 | Walters et al. | 73/100 |
| 3,512,404 | 5/1970 | Jureit | 73/100 |

*Primary Examiner*—Harry N. Haroian
*Attorney, Agent, or Firm*—Lee R. Schermerhorn

[57] ABSTRACT

A truss to be tested is laid on its side on a table having an upstanding flange along one side. A load cell is interposed between one end of the bottom chord of the truss and the table flange and a block is interposed between the opposite end of the bottom chord and the table flange. A flattened flexible tube is disposed on edge along a similar flange on the opposite side of the table. Blocks are inserted between the flexible tube and the top chord of the truss to simulate a uniform snow load when the tube is inflated. One-half the total load is measured directly by the load cell and the deflection of the center of the bottom chord is measured by a scale on the table. If the deflection remains within an allowable amount so as not to close a limit switch within a prescribed loading interval, a timer actuates a rubber stamp to mark the truss as having passed the test.

14 Claims, 5 Drawing Figures

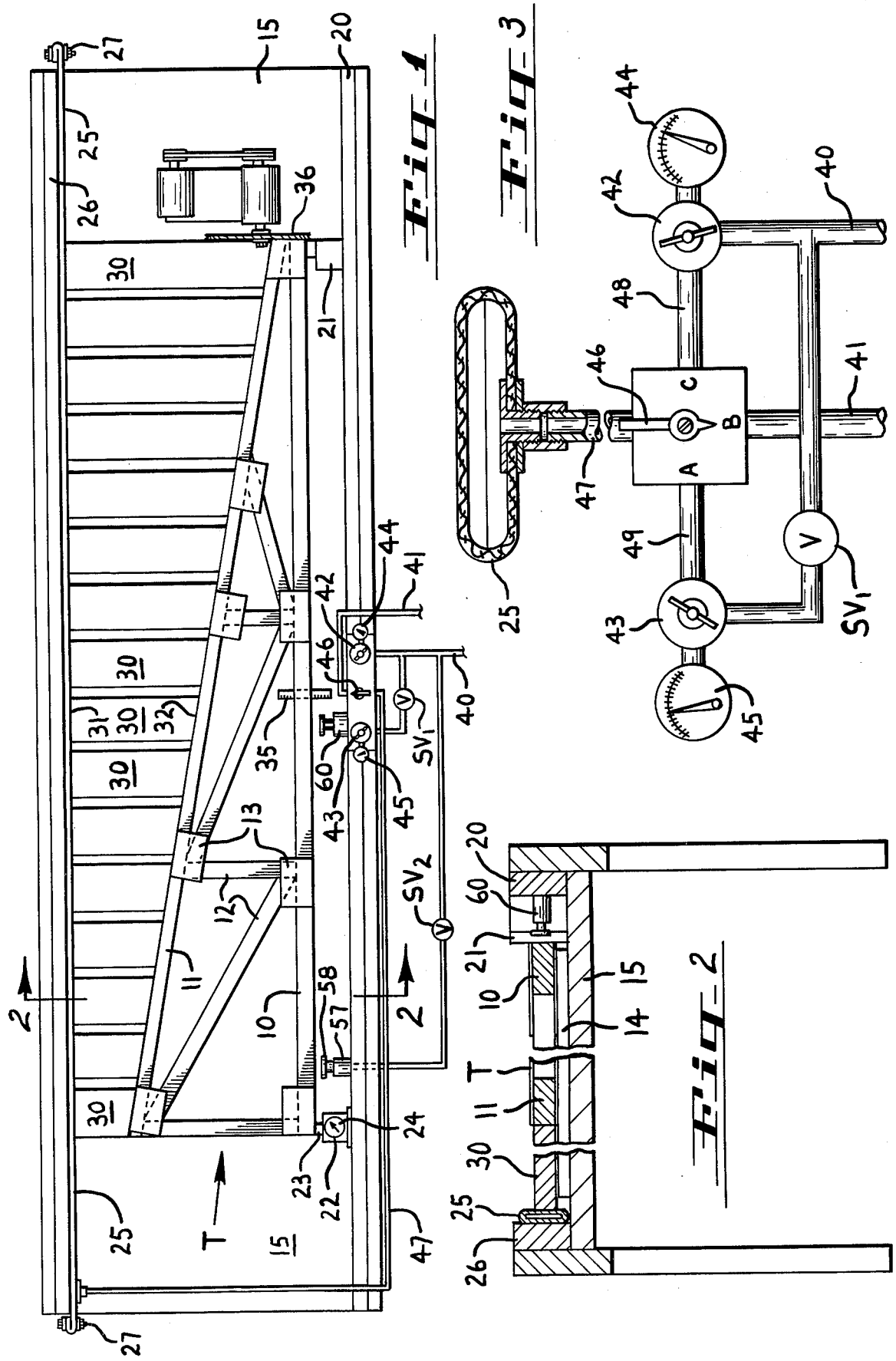

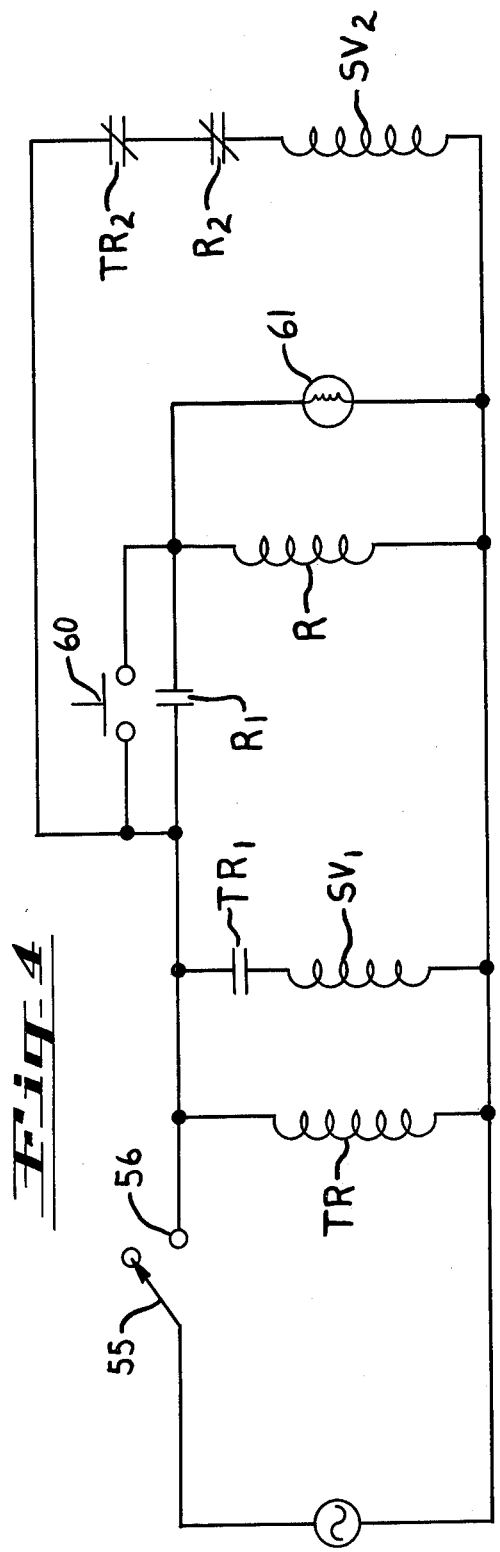
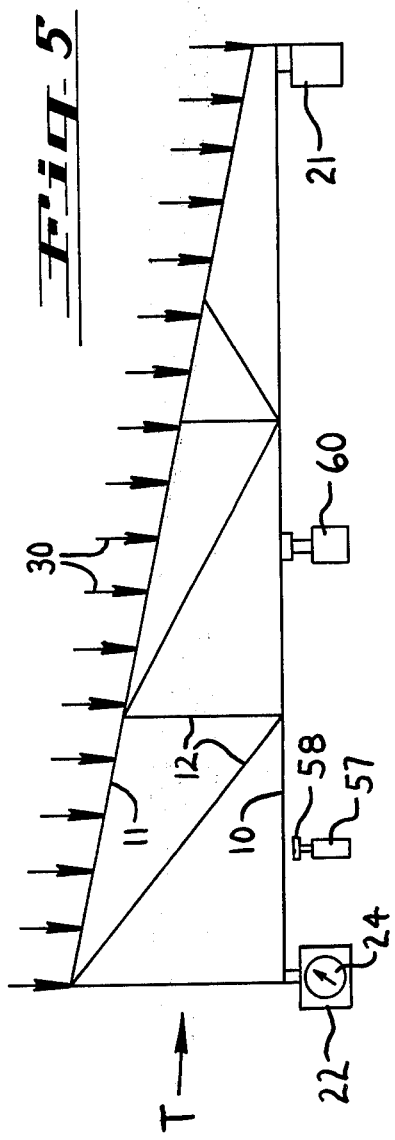

ROOF TRUSS TESTING MACHINE

BACKGROUND OF THE INVENTION

This invention relates to a machine for testing trusses, particularly for buildings and mobile homes which require a large number of identical roof trusses.

Heretofore, the inspection of such trusses by governmental authorities has been directed essentially toward theoretical design calculations, quality of the wood in the truss members and the performance of the grip plates which secure the truss members together. Such inspection and testing methods have been slow and generally unsatisfactory but have been generally adopted because of the lack of any simple and efficient machine for quickly testing a truss as a whole after it has been fabricated.

Objects of the invention are, therefore, to provide a truss testing machine, to provide a machine for applying a simulated snow load on a roof truss, and to provide a machine of the type described which is relatively simple and inexpensive to build and which gives thoroughly accurate and reliable results in operation.

SUMMARY OF THE INVENTION

The present machine provides means for quickly and accurately testing a complete truss without regard to the numerous details which have heretofore been considered, such as theoretical design, quality of the wood, strength of the grip plate connections and other such features and characteristics. The present machine applies a simple load test under which the truss either passes or fails. If the truss passes the test, it may be used; if it fails, it is rejected and destroyed.

The present testing machine comprises a table having an upstanding flange along one side. A truss to be tested is laid flat on the table with a load cell interposed between one end of the bottom chord of the truss and the table flange and a block interposed between the opposite end of the bottom chord and the table flange. A flattened flexible tube is disposed on edge along a similar flange on the opposite side of the table. Blocks are inserted between the flexible tube and the top chord to simulate a uniform snow load when the tube is inflated. One-half the total load is measured directly by the load cell and the deflection of the center of the bottom chord is measured by a scale on the table. If the truss successfully passes the loading test, this fact is registered by a rubber stamp activated by an automatic mechanism.

This testing procedure is based on the existence of a recognized relationship between the amount of deflection occurring in a short loading interval and the amount of deflection occurring after a long interval, such as days, weeks or months. This makes if possible to determine in a few seconds how a structure will behave under a continuous load existing for any specified length of time, as for example, a snow load persisting through the winter months.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a top plan view of a machine embodying the invention;
FIG. 2 is a view on the line 2—2 in FIG. 1;
FIG. 3 is a view showing the pneumatic system;
FIG. 4 is a wiring diagram of the electrical system; and
FIG. 5 is a schematic diagram of the machine functions.

DESCRIPTION OF THE PREFERRED EMBODIMENT

In FIG. 1 the truss T to be tested has a bottom chord 10, a top chord 11 and web members 12, all held together by conventional spiked grip plates 13.

The truss T is laid flad on a support member 14, such as a layer of slats, on a horizontal table 15 which has an upstanding abutment flange 20 extending along one side thereof. Bottom chord 10 is arranged parallel with flange 20 and a block 21 is inserted between one end of chord 10 and the flange 20. A conventional load cell 22 is inserted between the opposite end of chord 10 and flange 20.

Load cell 22 has a piston 23 arranged to engage the chord 10. Piston 23 operates in a hydraulic cylinder to actuate a pressure gauge 24, which is calibrated to indicate the number of pounds of load applied to the piston. The movement of the piston under load is insignificant in relation to the amount of deflection to be measured in the center of the truss.

Along the opposite side of the table a flattened flexible tube such as a fire hose 25 is disposed on edge against an upstanding abutment flange 26 which is parallel with the flange 20. The opposite ends of tube 25 are closed and sealed by a suitable means such as clamps 27.

A series of blocks 30 is inserted between tube 25 and top chord 11 along the entire length of the top chord with the blocks in substantially edge to edge relationship. Each block 30 has one end 31 cut off square to abut the flattened tube 25 and the other end 32 cut off on an angle corresponding to the angle of top chord 11.

Thus, when tube 25 is inflated the blocks 30 apply uniform loading, simulating a snow load on top chord 11. One-half of the total load applied to the top chord is registered on load cell scale 24. The deflection of the center of bottom chord 10 under a prescribed loading is observed on a stationary deflection scale 35 on the table underlying the center of bottom chord 10.

There is sufficient space between bottom chord 10 and flange 20 to permit destructive testing if desired. In a destructive test the pneumatic pressure in tube 25 is increased until the truss fails, the loading at failure being observed on load cell scale 24.

When a truss passes a test which is not a destructive test, a circular saw 36 mounted on table 15 is swung down into position to cut off square ends on the chord members 10 and 11. Useless sawing operations are thereby avoided on trusses which fail to pass the test and on trusses which are tested to destruction. Slat support 14 elevates the truss to the level of the center of flattened tube 25 and holds the truss above the table for the operation of saw 36.

When the testing and sawing operations are completed, the air is evacuated from tube 25, collapsing the tube and allowing the blocks 30 to be pushed back so that the truss may be removed from table 15 and a new truss placed in position for testing.

The pneumatic system in FIG. 3 is supplied by a pressure line 40 and vacuum line 41. One branch of pressure line 40 is connected to a pressure regulating valve 42 which may be adjusted to supply break load pressure to tube 25. A second branch of pressure line 40 is connected to a pressure regulating valve 43 which may be adjusted to produce a pre-determined loading on load cell scale 24 for deflection testing. The break load air pressure is indicated on a pressure gauge 44 and the deflection load air pressure is indicated on a pressure gauge 45. A three-position manual selector valve 46 is arranged to connect the supply pipe 47 for tube 25 to pipe 48 for admitting break load pressure, to pipe 49 for admitting deflection load pressure and to vacuum line 41 for exhausting the air from tube 25 after the test.

A deflection testing program for each truss is controlled by the electrical system shown in FIG. 4. First, manual valve 46 is turned to connect tube 25 with pressure pipe 49. When manual switch 55 is closed on contact 56, ten second timer relay TR is energized, causing the relay to close its normally open contacts $TR_1$ and open its normally closed contacts $TR_2$. The closing of contacts $TR_1$ energizes the coil of solenoid valve $SV_1$ to inflate tube 25 and load the truss. The inflation pressure has previously been adjusted by regulating valve 43 to a value which will produce a prescribed loading on the load cell scale 24.

If the truss does not experience excessive deflection, the electrical system does not perform any further function for the duration of the timed interval. At the end of the ten second load period, timing relay TR deenergizes itself by means of an internal switch (not shown), causing closed relay contacts $TR_1$ to re-open and causing the opened contacts $TR_2$ to re-close.

The opening of contacts $TR_1$ deenergizes solenoid valve $SV_1$ to close the valve and shut off air pressure to tube 25. The air is evacuated from tube 25 by turning manual valve 46 to connect the tube with vacuum line 41. The re-closing of timer relay contacts $TR_2$ energizes solenoid valve $SV_2$ to open the valve and admit air to stamp cylinder 57 in FIG. 1 to actuate the rubber stamp 58. Stamp 58 applies some word or symbol to the truss, indicating passing of the test and acceptance. Then switch 55 is opened and the truss is replaced with the next truss to be tested. The opening of switch 55 re-sets the timer relay TR.

When the next truss is placed on the table for testing, manual valve 46 is turned to connect tube 25 with pressure pipe 49 and switch 55 is closed on contact 56 as before, energizing timing relay TR for a ten second interval. The energizing of relay TR opens the closed contacts $TR_2$ and closes the open contacts $TR_1$ to energize solenoid valve $SV_1$ and admit the predetermined air pressure into tube 25 to load the truss for a ten second interval. Let it be assumed that this truss does not pass the test. In this event, excessive deflection of the truss closes the limit switch 60, energizing relay R and truss fail light 61.

Energization of relay R closes normally open relay contacts $R_1$ and opens normally closed relay contacts $R_2$. Contacts $R_1$ close a holding circuit for relay coil R and truss fail light 61 so that these elements remain energized even if switch 60 opens during or after the ten second load period. At the expiration of the ten second load period, contacts $TR_2$ close but the contacts $R_2$ remain open, causing solenoid valve $SV_2$ to remain deenergized and the rubber stamp 58 is not actuated. This truss is, therefore, rejected. Timing relay TR deenergizes itself as before and opens contacts $TR_1$. Solenoid valve $SV_1$ is thereby also deenergized to close valve $SV_1$ in FIG. 3 and permit deflation of tube 25 by manual selector valve 46. After completion of the test switch 55 is opened, causing timer relay TR to re-set.

Thus, a large number of identical trusses may be tested quickly and efficiently. When a different shape of truss is to be tested it is only necessary to prepare new blocks 30 to fit the truss and make appropriate adjustment of pressure regulating valve 43 to produce a prescribed half load reading on load cell scale 24.

Having now described my invention and in what manner the same may be used, what I claim as new and desire to protect by letters patent is:

1. A truss testing machine comprising a table adapted to support a truss lying on it side, upstanding abutment flange means on one side of said table, an abutment block on said table arranged to bear horizontally against said flange means and provide an abutment against one longitudinal edge of the truss at one end thereof, a force indicating load cell on said table arranged to bear horizontally against said flange means and provide an abutment against said edge of said truss at the opposite end thereof, an upstanding abutment flange extending along the opposite side of said table, a flattened flexible tube on said table sealed at its ends and extending along said second flange, a series of pressure transmitting blocks on said table disposed between said tube and the opposite longitudinal edge of said truss, an air pressure supply source to inflate said tube, and a vacuum supply source to evacuate said tube, the inflation of said tube causing said pressure transmitting blocks to apply substantially uniform loading along the length of the truss.

2. A machine as defined in claim 1, said tube comprising a hose such as a fire hose.

3. A machine as defined in claim 1, said pressure transmitting blocks being arranged substantially edge to edge to apply substantially continuous loading throughout the length of the truss.

4. A machine as defined in claim 1 including a transverse scale on said table to measure the deflection of the truss intermediate its ends.

5. A machine as defined in claim 1, said tube comprising a hose such as a fire hose, said pressure transmitting blocks being arranged in substantially edge to edge relation to apply substantially continuous loading throughout the length of the truss, a scale on said table arranged to measure the deflection of the truss intermediate its ends, and a valve for connecting said tube selectively with said sources of air pressure or vacuum.

6. A machine as defined in claim 1, said air pressure supply source including an air pressure supply pipe having two branches, a pressure regulating valve in one branch for supplying a predetermined air pressure to said tube for deflection testing under a constant predetermined load on the truss, a pressure regulating valve in the other branch for increasing the pressure in destruction testing, said vacuum supply source including a vacuum supply pipe, and a selector valve for connecting said tube with either one of said branches of said air pressure supply pipe or with said vacuum supply pipe.

7. A machine as defined in claim 1 including a cut-off saw on said table for cutting off protruding ends of chord members in said truss.

8. A machine as defined in claim 1 including timing means arranged to shut off said air pressure supply source for said tube after a predetermined loading interval, and signal means to indicate excessive deflection of the truss under load.

9. A machine as defined in claim 8, said timing means comprising a timing relay and said signal means including a limit switch actuated by deflection of the truss.

10. A machine as defined in claim 8 including stamp means operable on said truss and actuated by said timing means at the end of said loading interval in the absence of a signal by said signal means.

11. A truss testing machine for a truss having a bottom chord member and a top chord member, a flattened flexible tube closed at its ends extending the length of said top chord member and arranged to apply substantially uniform loading along the length of said top chord member when the tube is inflated, means for inflating and evacuating said tube, means engaging the ends of said bottom chord member arranged to prevent substantial movement of said ends when said top chord member is loaded by inflation of said tube, means to indicate the magnitude of said loading, and means to indicate excessive deflection of the truss under said loading.

12. A machine as defined in claim 11 including timing means to maintain inflation of said tube for a predetermined interval of time and then shut off said inflating means.

13. A machine as defined in claim 12 including stamp means operable on said truss and activated by said timing means at the end of said inflation interval in the absence of an indication of excessive deflection.

14. A machine as defined in claim 11 including a series of pressure transmitting blocks disposed between said tube and said top chord member of the truss.

* * * * *